(12) United States Patent
Brothers

(10) Patent No.: US 7,248,734 B2
(45) Date of Patent: Jul. 24, 2007

(54) REVERSE UPSAMPLING METHOD AND SYSTEM

(75) Inventor: Kent M. Brothers, North Vancouver (CA)

(73) Assignee: Kodak Graphic Communications Canada Company, Burnaby, British Columbia (CA)

( * ) Notice: Subject to any disclaimer, the term of this patent is extended or adjusted under 35 U.S.C. 154(b) by 741 days.

(21) Appl. No.: 10/625,335

(22) Filed: Jul. 22, 2003

(65) Prior Publication Data

US 2005/0018917 A1    Jan. 27, 2005

(51) Int. Cl.
*G06K 9/00* (2006.01)

(52) U.S. Cl. .................. 382/166; 382/162; 382/298

(58) Field of Classification Search ........... 382/253, 382/176, 162, 166, 266, 298, 275, 243; 358/445, 358/3.07; 348/163, 607, 625; 600/450
See application file for complete search history.

(56) References Cited

U.S. PATENT DOCUMENTS

| 4,771,470 | A | * | 9/1988 | Geiser et al. ............... 382/266 |
| 5,293,254 | A | * | 3/1994 | Eschbach .................... 358/445 |

* cited by examiner

*Primary Examiner*—Anh Hong Do
(74) *Attorney, Agent, or Firm*—Donna P. Suchy

(57) ABSTRACT

The present invention provides for a method and system for reducing the storage required for transmitting digital images. The reduction is accomplished by coalescing identical pixels that are adjacent to each other. Accordingly, a determination is made as to whether pixels along a first axis are identical with pixels along a second axis and, if they are identical, they are coalesced together. The process is repeated along a second axis such that an image resulting from the reduction is significantly smaller, especially if the image was originally upsampled. The present invention reverses the upsampling process to create a reduced image. Additionally, the present invention allows for differentiation between upsampled contone data and linework data that may be overlaid over upsampled contone data. Image data that is linework data is treated as wild card pixels in the image and may be coalesced with any adjacent pixel when coalescing adjacent pixels.

22 Claims, 11 Drawing Sheets

REVERSE UPSAMPLING METHOD AND SYSTEM

FIELD OF THE INVENTION

The present invention relates to the storage of graphical images and, more specifically, to a method and system for reducing the size of graphical images for storage or communication within computing environments.

BACKGROUND OF THE INVENTION

A variety of image processing systems for compressing image data and decoding the compressed data to display decoded image data have been proposed with the increased demands for digital images. Extremely high-speed image processing and image reading allow image data, recorded in a compressive form, to be reconstructed in a much more efficient manner. However, for large images, the ability to transfer and process an image may be hampered unless it is efficiently compressed.

Known processes of image data compression include orthogonal transform coding, discrete cosine transform (DCT) coding, and Huffman coding. A known image coding and compressing method by orthogonal transform is an H.261 image coding process of CCITT (Comite Counsultatif International Telegraphique et Telephonique). An example of DCT compression for color images is an image coding method based on a J-PEG (Joint Photographics Expert Group) algorithm d.

In conventional image compression processes, image data is coded in block units according to an irreversible transform where original image data is not reconstructed perfectly by decoding. Continuity of an original image may thus be interrupted undesirably on a boundary of adjacent blocks. An interblock distortion removal filter is conventionally used to eliminate such discontinuity. This filter stores decoded video data and executes a filter operation or, more concretely, calculates a weighted average of data of adjacent pixels while reading data of adjacent blocks.

The conventional image processing and decoding systems described above have problems in efficiently handling upsampled continuous tone ("contone") images, especially upsampled contone images that incorporate linework in the image as well. Upsampling is the process of taking an original image and increasing the image by taking a single pixel and turning it into an image component of "n×n" pixels. For example, a single pixel may be tripled in the horizontal and vertical axes to create a 9-pixel (3×3) upsampled image component. One interesting image type, which includes both contone and linework data, is an image that includes upsampled contone backgrounds with linework details. The upsampled contone background includes a significant quantity of redundant information. However, the linework details generally do not have the same type of redundant information. Processing uncompressed images with both upsampled and linework data can be difficult for the reasons noted above with regard to large images. Accordingly, there is a need for an efficient compression algorithm for upsampled images that includes both contone and linework data.

SUMMARY OF THE INVENTION

The present invention provides for a method and system for reducing the storage and bandwidth required to transmit digital images. In general, the reduction in storage is accomplished by coalescing identical pixels that are adjacent to each other within a particular area or block of an image, e.g., within an "n×n" pixel area of an image. More specifically, a determination is made as to whether each of the pixels in a first row within the block is identical to each of the pixels along a second row within the block and, if they are identical, the first and second rows of pixels are coalesced together. For example, if two rows of pixels all have identical color values, then they may be coalesced. The process is repeated along each of the rows within the block and preferably also between each of the columns such that an image resulting from the compression is significantly smaller, especially if the image was originally upsampled.

The present invention reverses the upsampling process to create a reduced size image. Additionally, the present invention allows for differentiation between upsampled contone data and linework data that may overlay the upsampled contone data. In particular, image data that are determined to be linework data are treated as wild card pixels in the image and may be matched with any colored adjacent pixel when coalescing rows or columns.

The categorization of linework and contone data may be accomplished by a number of processes. In one exemplary embodiment, the number of pixels in an image that are the same color are counted to determine if a number of pixel colors is significantly more common than other pixel colors in the image. Those significantly more common pixel colors are designated as linework colors and are treated as such for purposes of the invention.

In another exemplary embodiment, categorizing colors in an image as linework or contone data is accomplished by determining a regular pattern of pixels from the image, locating pixels of a particular color(s) that does not conform to the determined regular pattern, then setting those pixels of the color(s) as linework pixels for purposes of the present invention. In one particular embodiment of the present invention, determining regular patterns includes calculating color transitions along one axis and color transitions along a second axis. These determinations help find pattern boundaries of contone pixels based on high transition counts as indicating pattern boundaries. This in turn allows for determining a regular pattern in the image based on the pattern boundaries.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
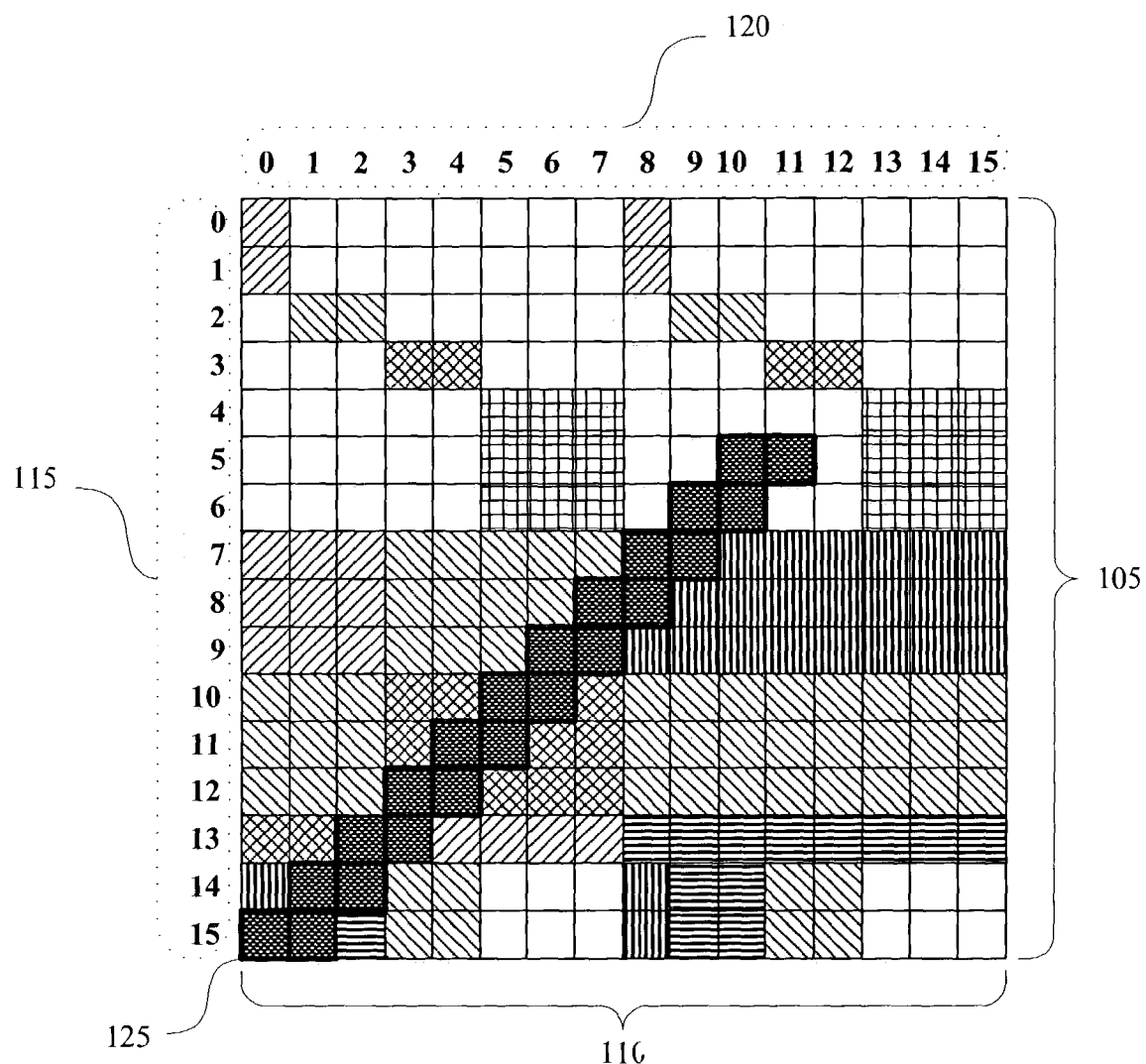
FIG. 1 is a graphical representation of a portion of a graphical image, the portion containing a 16×16 grid of pixels with different color values.
Figure 2A:
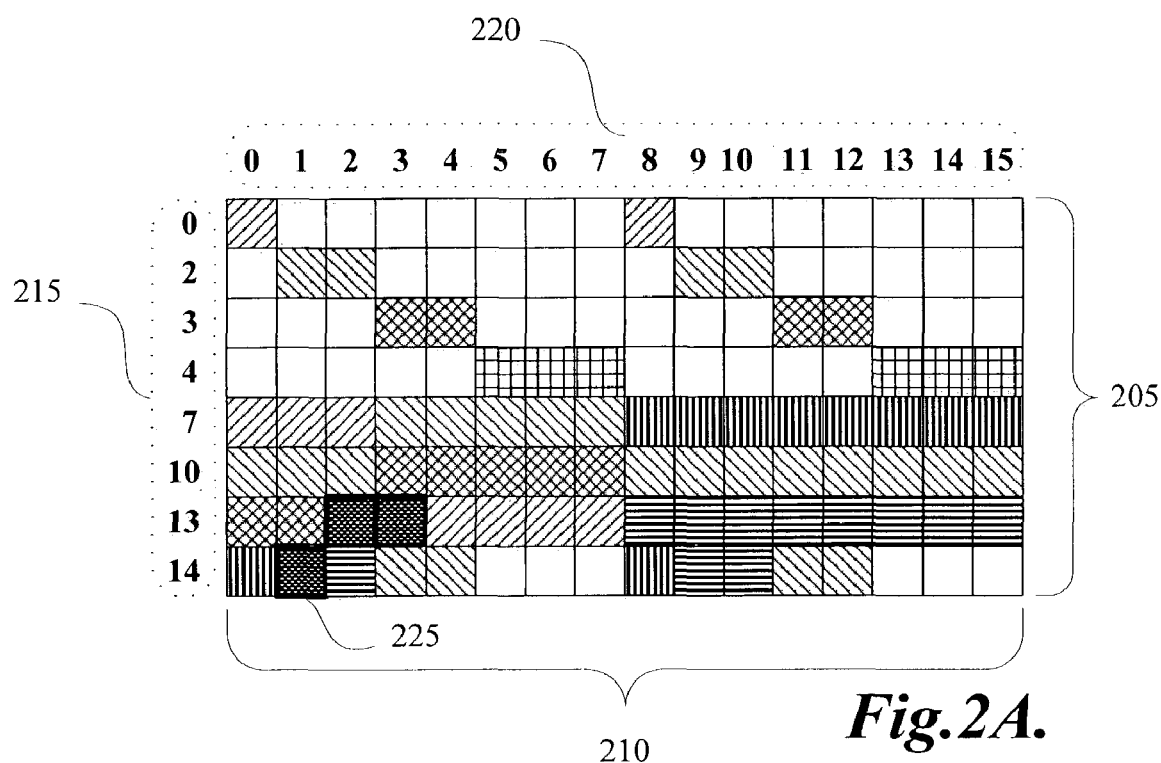
FIG. 2A is a graphical representation of the portion of the graphical image of FIG. 1 that has been vertically reduced in accordance with the present invention.
Figure 2B:
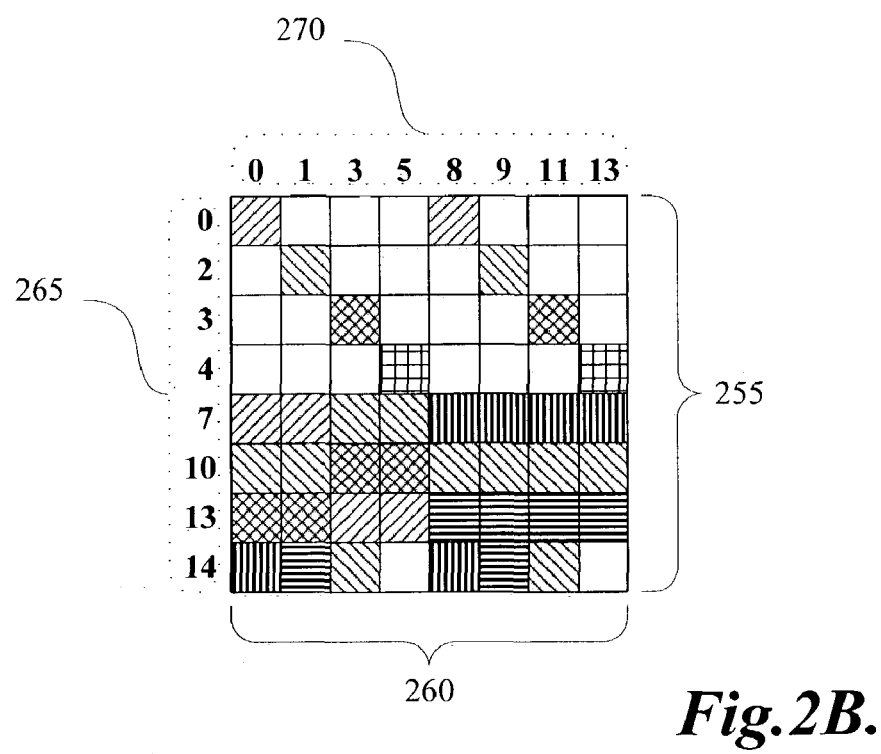
FIG. 2B is a graphical representation of the portion of the graphical image as shown in FIG. 2A that has been horizontally reduced in accordance with the present invention.

The present invention is directed to providing a method and system for reducing the storage required for graphical images. One embodiment of the invention provides for increased reduction in graphical image storage size by utilizing differences between linework and continuous tone ("contone") pixels within a graphical image. FIGS. 1, 2A, and 2B provide illustrations of the operation of the present invention. FIG. 1 is an exemplary block of pixels that have not been compressed. FIG. 2A represents the same block as FIG. 1, but in an intermediate stage of compression. Finally, FIG. 2B illustrates the compressed version of FIG. 1.

FIG. 1 illustrates a grid of pixels 100 having a set of rows 105 and a set of columns 110. Additionally, FIG. 1 has row labels 115 that are numbered from "0" to "15," and column labels 120 that are also labeled from "0" to "15." In addition to the assorted pixels of various colors, FIG. 1 also includes linework pixels 125 represented by darker shading than the other pixels. In one exemplary embodiment of the present invention, the linework pixels are saved, separately from the contone pixels, at their full resolution. As will be more fully understood below, the pixels containing linework data are treated as "wild cards" for purposes of coalescing an image in accordance with the present invention.

FIG. 2A represents a vertically coalesced graphical image in which the linework pixels 225 have been treated as wild card pixels in accordance with the present invention. FIG. 2A has been coalesced by combining each row that is identical with adjacent rows (taking wild card pixels into account). Therefore, the rows with labels 0 and 1 of FIG. 1 have been coalesced into a single row 0 of FIG. 2A. Note, however, that the row 2 of FIG. 1 remains labeled as row 2. Accordingly, when reproducing the graphical image, the present invention is able to determine that there is an identical row to row 0 that comes between rows 0 and 2. In FIG. 1, there is no adjacent row identical to either row 2 or 3. Accordingly, rows 2 and 3 are left the same in FIG. 2A. However, rows labeled 4, 5, and 6 are identical for purposes of the present invention. Even though rows 5 and 6 include linework pixels, linework pixels are treated as wild card pixels and may be combined with pixels of adjacent rows of any color. Accordingly, rows 4, 5, and 6 are combined into a single row 6 of FIG. 2A. Similarly, rows 7, 8, and 9 are combined; rows 10, 11, and 12 are combined; and rows 14 and 15 are combined. Row 13 is not combined with any other row. As can be seen from the coalesced image in FIG. 2A, the amount of information that needs to be stored to reproduce the image of FIG. 1 has been greatly reduced. Instead of 256 pixels that need to be represented in FIG. 1, only 128 pixels need to be represented in FIG. 2A.

This process may be repeated on columns as well. Accordingly, FIG. 2B represents a coalescing of the columns 210 of FIG. 2A. Once the columns of FIG. 2A have been coalesced, the graphical image 255 of FIG. 2B only holds 64 pixels that need to be stored to represent the contone data of FIG. 1. Considering that contone images are conventionally of a higher bit depth (e.g., contain more color information per pixel), even a marginal reduction in the number of pixels that need to be stored for a contone image results in a much greater increase in efficiency of storing, transmitting, and processing contone images.

Figure 3:
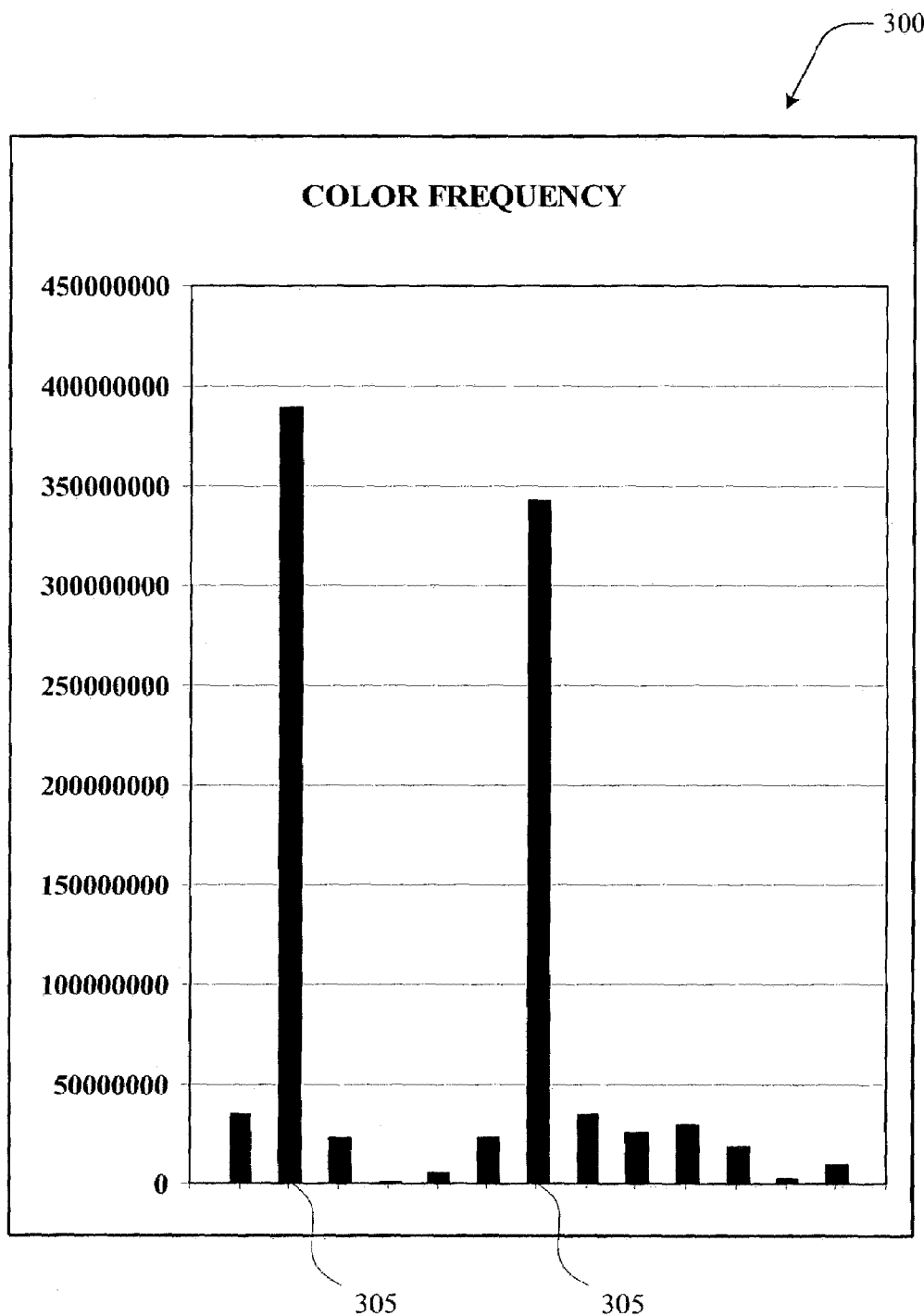
FIG. 3 is a representative screen shot of a color frequency chart for use in the present invention.

In order to treat the linework pixels as wild cards, the linework pixels have to be differentiated from contone data in a graphical image. One method of differentiating contone data from linework data is from the observation that linework data is always of a particular color and, accordingly, will occur much more frequently in a graphical image than colors in the contone data. This is readily apparent, as contone data generally includes a myriad of different colors and shades, none of which tends to dominate the overall image. Accordingly, if a particular pixel color is much more frequent (e.g., an order of magnitude or more frequent) than any other colors in the graphical image, it will generally be linework data or substantially common enough that, for all intents and purposes, it can be treated as linework data and still increase the efficiency of the present invention. FIG. 3 illustrates a color frequency chart of pixels in an exemplary graphical image. Note that two bars 305 of the chart are substantially higher than the bars in the rest of the chart representing pixel colors that occur much more frequently than other pixels in the image. Those of ordinary skill in the art will appreciate that FIG. 3 is merely an exemplary chart and that a substantially more frequent pixel color could be relatively more or less frequent than illustrated in FIG. 3.

Figure 4A:
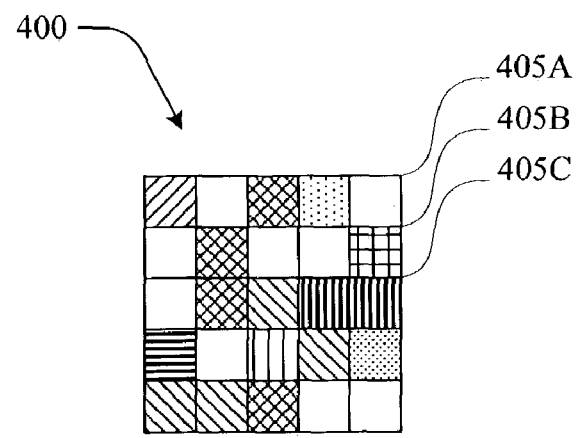
FIG. 4A is an exemplary graphical image containing pixels of different color values.
Figure 4B:
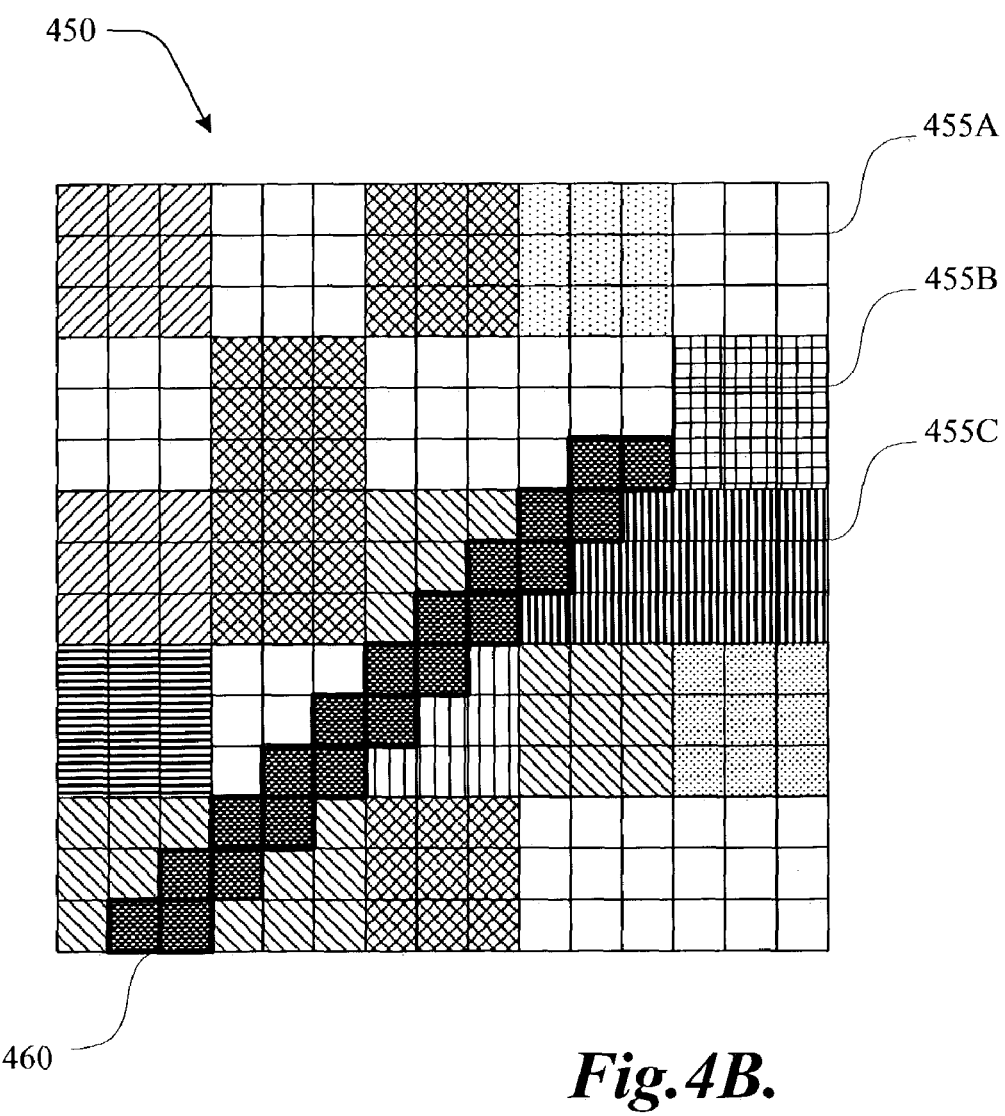
FIG. 4B is an upsampled graphical image of the graphical image in FIG. 4A of the upsampled graphical image further including linework pixels overlaying the original upsampled pixels.

One reason that mixed contone and linework images may benefit from the present invention is that a common method of creating a contone image is to upsample a smaller contone image to create a larger graphical image. Then, linework pixels are added to the upsampled contone image. FIGS. 4A and 4B illustrate such an upsampling. FIG. 4A contains a graphical image 400, in which 3 pixels have been noted, pixels 405A-C. FIG. 4B illustrates a new graphical image 450 that has been upsampled, by tripling the height and width of the pixels in FIG. 4A. Accordingly, pixel 405A becomes the group of 9 pixels 455A, the pixel 405B becomes a group of 9 pixels 455B, and the pixel 405C becomes the group of 9 pixels 455C. Additionally, on top of the upsampled contone data shown in graphical image 450, linework data has been inserted into graphical image 450 and is represented by the dark pixels 460.

As can be seen from FIGS. 4A and 4B, a relatively small amount of information represented by the graphical image 400 is expanded to form a much larger graphical image 450; however, the addition of the linework pixels 460 makes the reversal of the process more difficult. The present invention is able to overcome this difficulty by determining which pixels are linework pixels and which are contone pixels.

Figure 5:
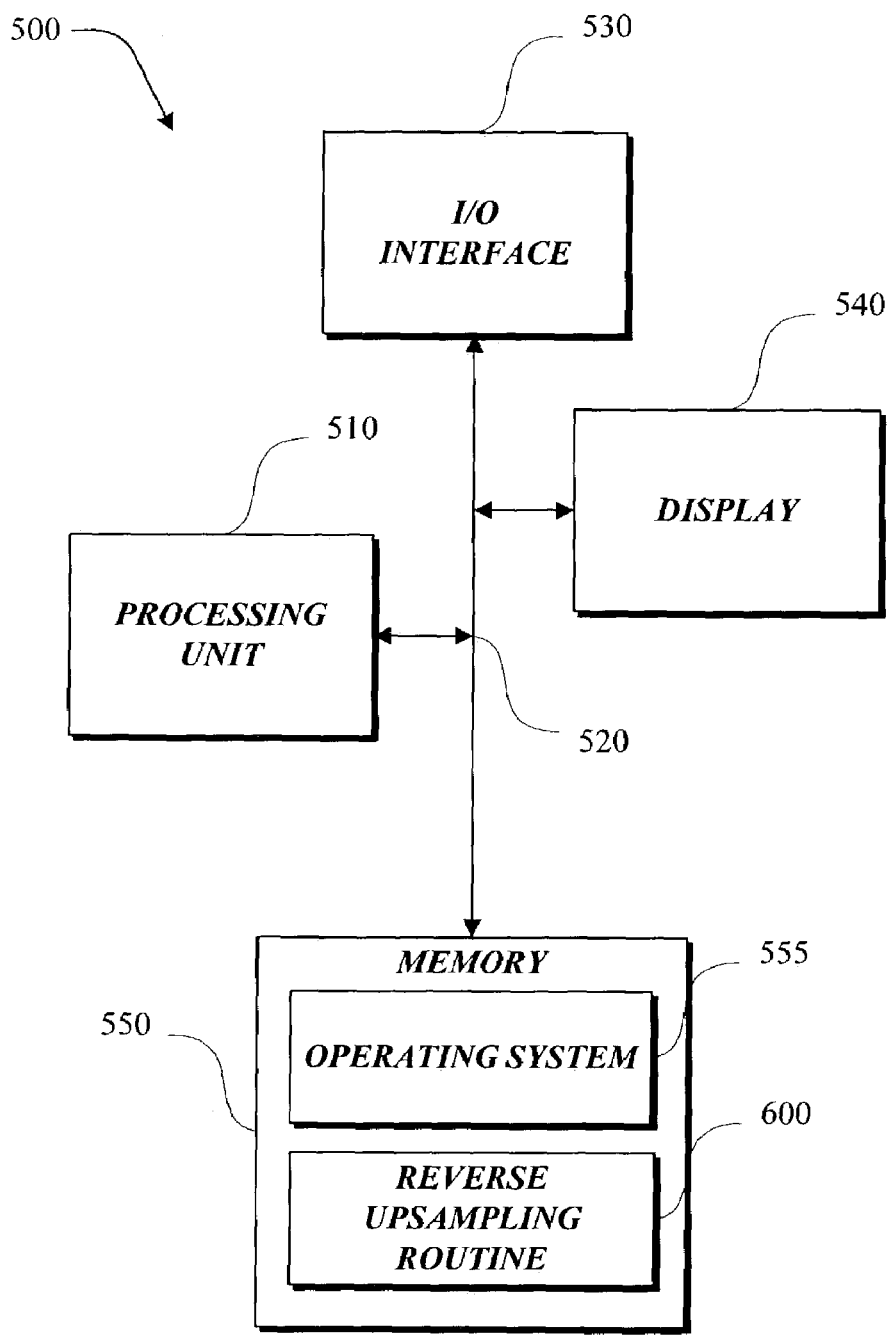
FIG. 5 is a block diagram illustrating several components of a computing device used to reverse upsample graphical images in accordance with the present invention.

FIG. 5 depicts several of the key components of an exemplary computing device 500 used to reverse upsample graphical images in accordance with the present invention.

Those of ordinary skill in the art will appreciate that the computing device 500 includes many more components than those shown in FIG. 5. However, it is not necessary that all of these generally conventional components be shown in order to disclose an illustrative embodiment for practicing the present invention. As shown in FIG. 5, the computing device 500 includes an input/output ("I/O") interface 530 for input and output of information to and from the computing device 500. As will be appreciated by those of ordinary skill in the art, the I/O interface 530 includes the necessary circuitry for such a connection.

Figure 6:
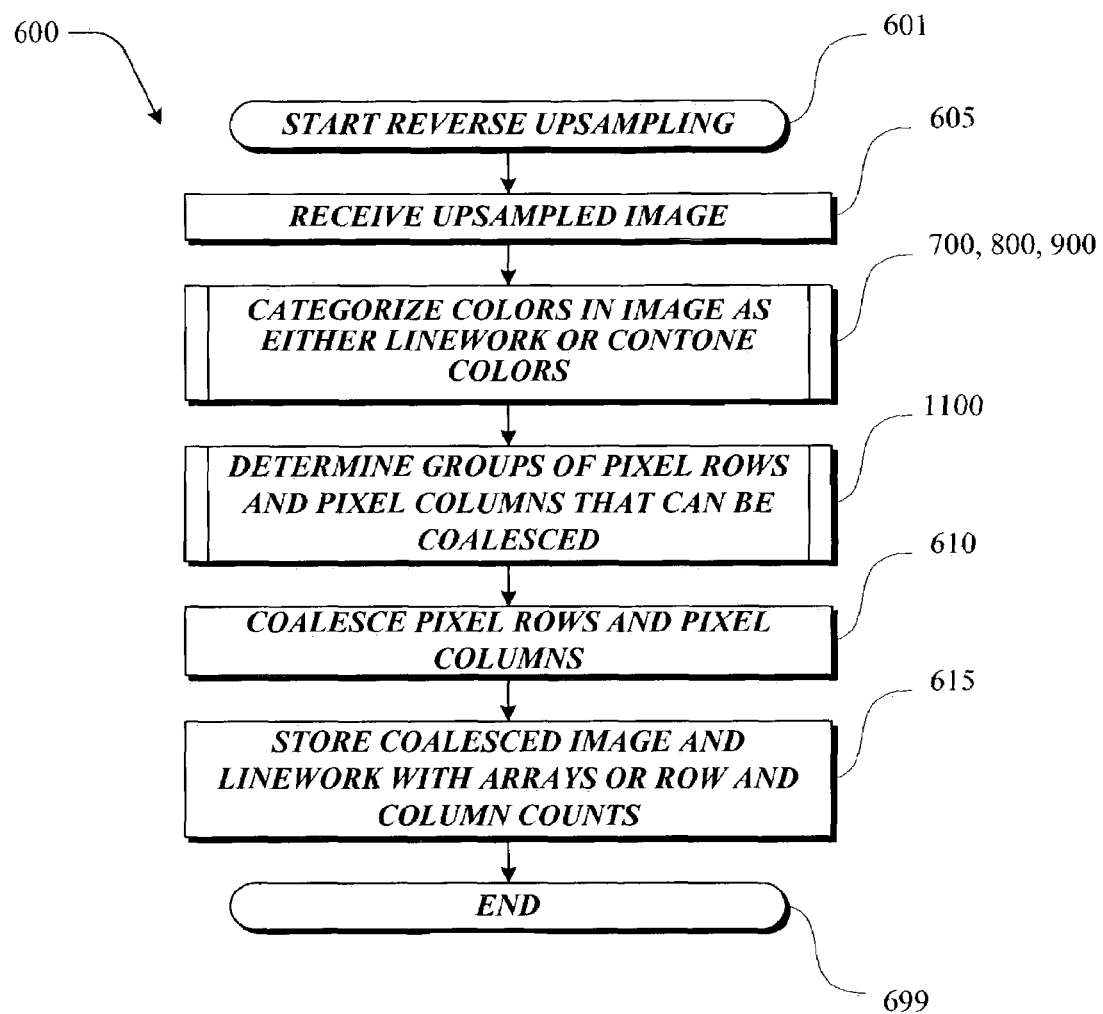
FIG. 6 is an overview flow diagram illustrating a reverse upsampling routine used by the computing device of FIG. 5 in accordance with the present invention.

The computing device 500 also includes a central processing unit 510, a display 540, and a memory 550 connected via a bus 520. The memory 550 generally comprises random access memory ("RAM"), read-only memory ("ROM"), and a persistent mass storage device such as a hard disk drive, tape drive, optical drive, floppy disk drive, or a combination thereof. The memory 550 stores an operating system 555 for controlling the operation of the computing device 500. The memory 550 also includes a reverse upsampling routine 600 for reducing graphical image sizes in accordance with the present invention. The reverse upsampling routine 600 is described in greater detail below with regard to FIG. 6. It will be appreciated by those of ordinary skill in the art that these components may be stored in a computer readable medium and loaded into memory 550 of the computing device 500 using a drive mechanism associated with the computer readable medium, such as a floppy or CD-ROM/DVD-ROM drive, or the I/O adapter 530.

As mentioned above, FIG. 6 illustrates an exemplary logic routine 600 for reverse upsampling of a graphical image. Routine 600 starts at block 601 and proceeds to block 605 where it receives an upsampled image. Next, either subroutine 700, 800, or 900 is called to determine which colors in the image are linework colors and which are contone colors. Those skilled in the art will appreciate that any of subroutines 700, 800, or 900 may be used, as well as other methods that differentiate linework data from contone data in a graphical image. Next, in block 1100, a determination is made to determine which group of pixel rows and pixel columns may be coalesced. The determination method of block 1100 is described in more detail below with respect to FIG. 11. Next, in block 610, for each block of pixels, collapsible rows and columns of pixels are coalesced together as in FIGS. 2A and 2B. Then, in block 615, the image with the coalesced rows and columns is stored. Those of ordinary skill in the art will appreciate that if linework pixels were distinguished, they may be stored separately. Routine 600 then ends at block 699.

Figure 7:
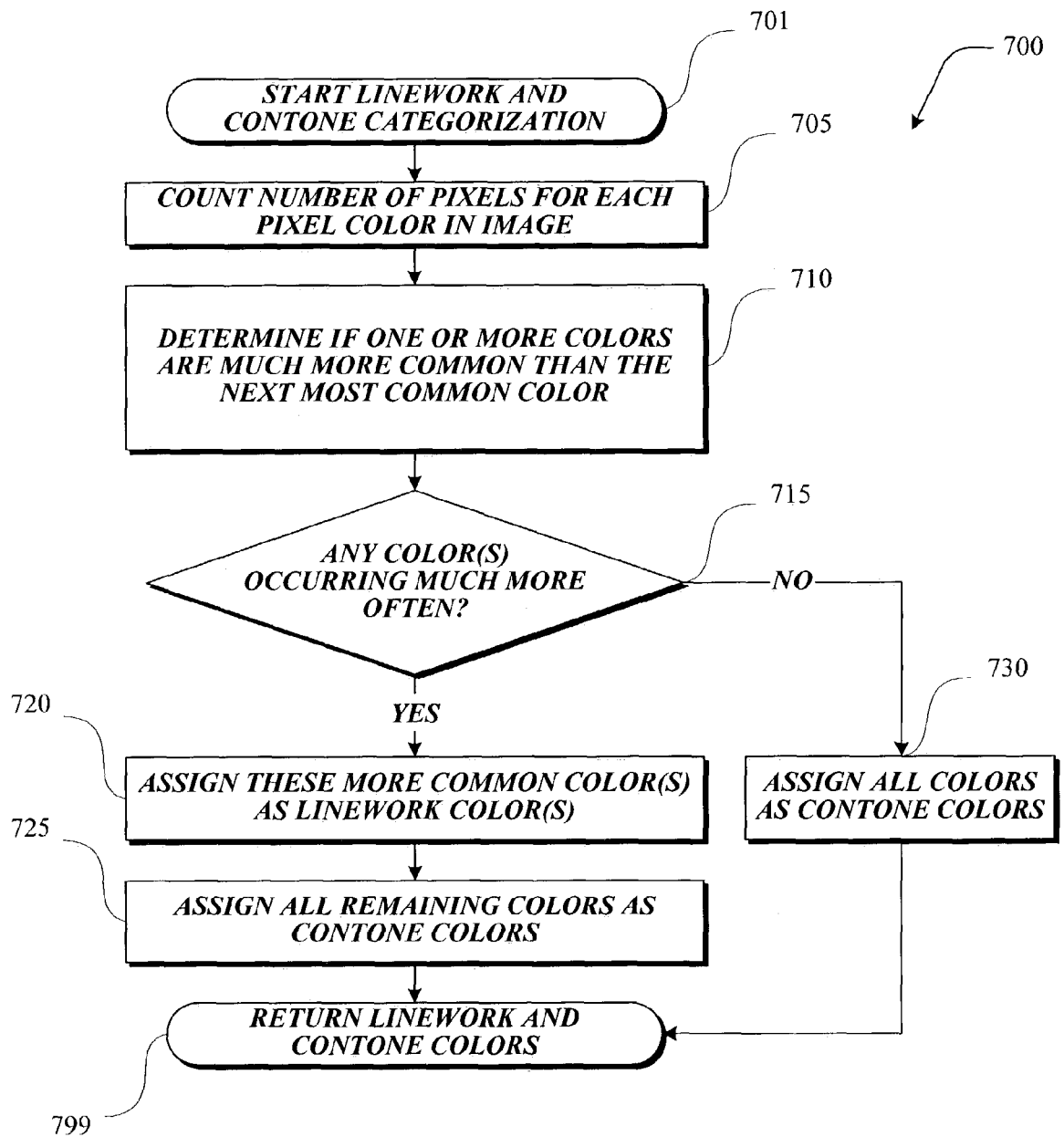
FIGS. 7-9 are overview flow diagrams, each illustrating a subroutine for detecting linework and contone pixels within a graphical image in accordance with the present invention.

FIG. 7 illustrates the logic flow of a linework and contone categorization subroutine 700. Subroutine 700 begins in block 701 and proceeds to block 705 where the number of pixels for all colors of pixels in a graphical image is calculated. Next, in block 710, a determination is made if one or more colors are much more common than other colors of the image. As mentioned earlier, one of the methods of determining if particular pixels are linework pixels is by determining that they are much more common than other colors of pixels, which are most likely contone pixels within a graphical image. The linework pixels may be of a single color or possibly of multiple colors. In an exemplary embodiment of the present invention, the linework colors are separately stored using a bit depth sufficient to represent the number of colors used in the linework pixels. For example, if only one linework color was used, then a bit depth of 1 would be sufficient. However, if 2 or 3 colors were used to represent linework data, then 2 bits of information would be used to store the linework pixels and so forth.

Next, in subroutine 700, logic flows to decision block 715 where a determination is made if any of the colors occur much more commonly than other colors. As noted before, one threshold is if any color or colors occur, by an order of magnitude, more often than the other colors in the graphical image. If, in decision block 715, it is determined that there are no colors that occur much more often, then subroutine 700 continues to block 730 where all colors are assigned as contone colors and subroutine 700 then ends at block 799. Otherwise, if in decision block 715, a determination is made that one or more colors occur much more often than the remaining colors, then, in block 720, the more common colors are assigned as linework colors, and next, in block 725, all remaining colors are assigned as contone colors. Subroutine 700 then ends in any case at block 799 and processing returns to the calling routine.

Figure 8:
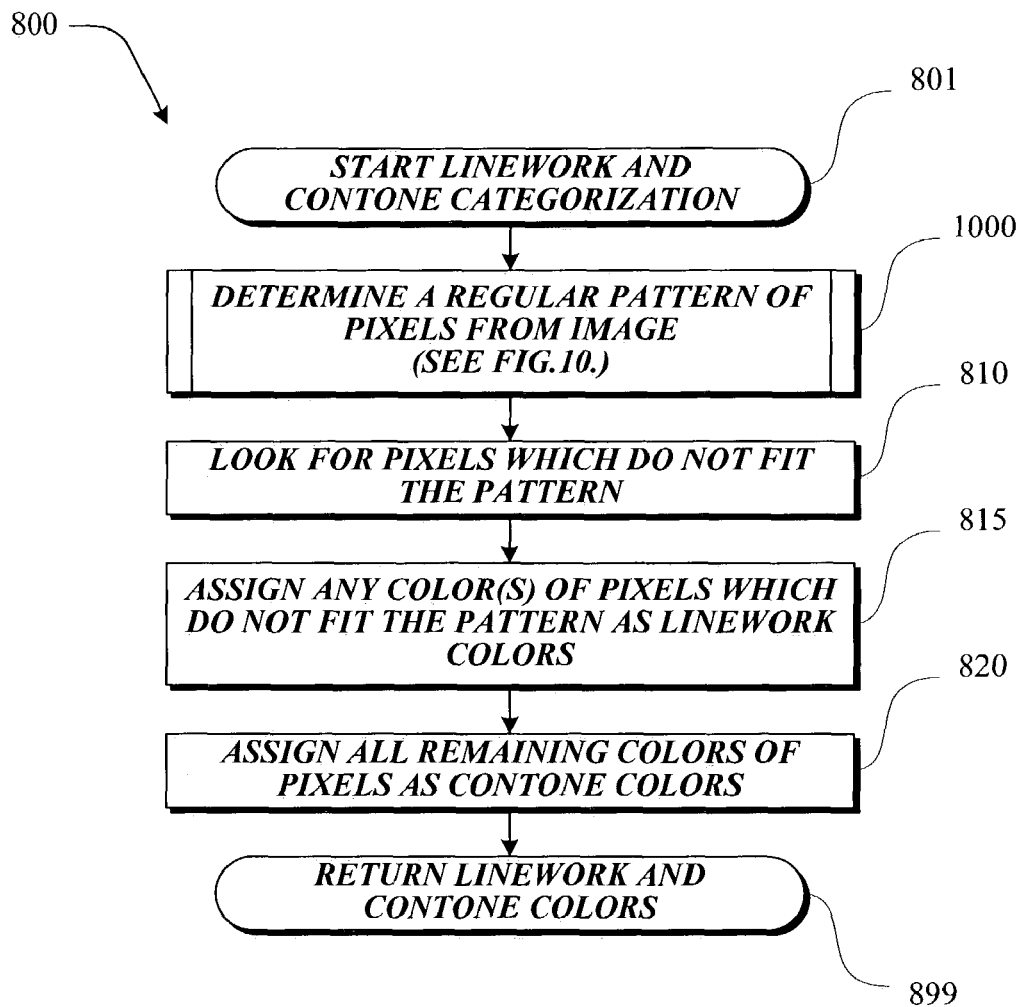
Figure 10:
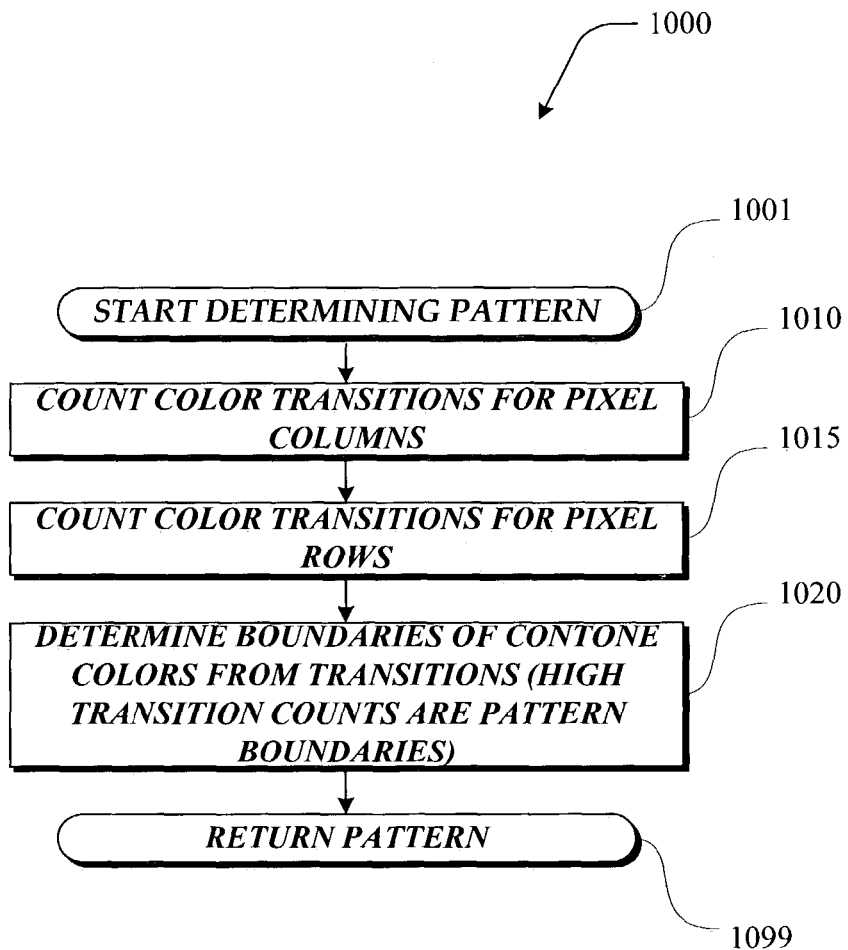
FIG. 10 is an overview flow diagram illustrating a subroutine for determining patterns in a graphical image as used by the subroutines in FIGS. 8 and 9 in accordance with the present invention.

FIG. 8 also illustrates the logic flow of an alternate linework and contone categorization subroutine 800, which may be used by the reverse upsampling routine 600. Subroutine 800 starts at block 801 and proceeds to block 1000 which calls a subroutine for determining a regular pattern of pixels from a graphical image. Subroutine 1000 is shown in FIG. 10 and described in greater detail below with regard to FIG. 10. Once subroutine 1000 returns, logic flow continues to block 810 where pixels that do not fit the pattern returned from subroutine 1000 are looked for. Next, in block 815, any color or colors of pixels that do not fit the pattern as determined in subroutine 1000 are assigned as linework pixels and colors. Then, in block 820, all remaining colors of pixels are assigned as contone pixels and colors. Subroutine 800 then returns the linework and contone colors in block 899 to the calling routine.

Figure 9:
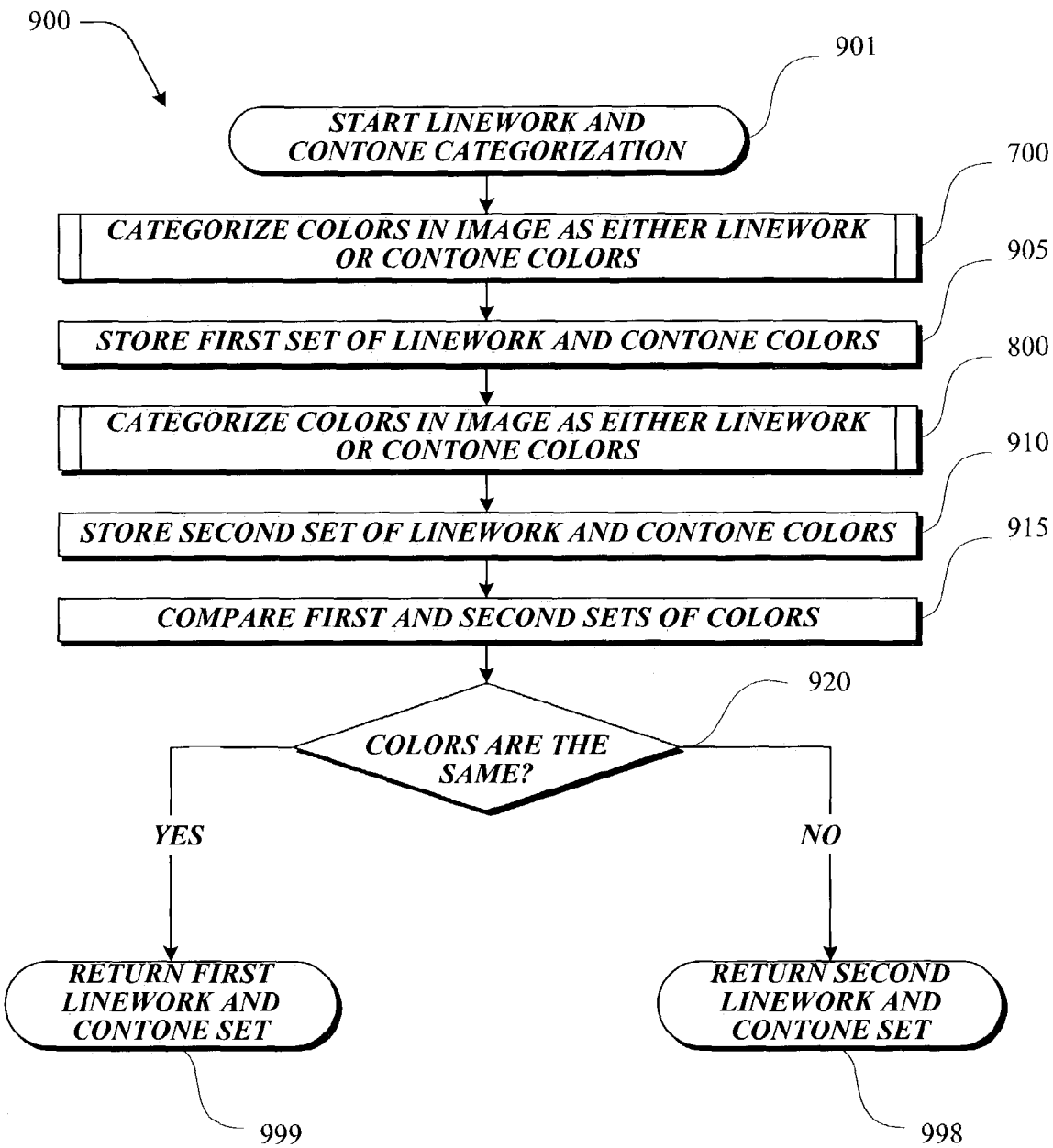

FIG. 9 illustrates an exemplary logic flow of yet another alternative linework and contone categorization subroutine 900. Subroutine 900 combines features of subroutines 700 and 800. Subroutine 900 starts at block 901 and proceeds to block 700 where subroutine 700 is executed. Next, in block 905, the results are stored as a first set of linework and contone colors. In block 800, subroutine 800 is executed and the results are then stored in block 910 as a second set of linework and contone colors. In block 915, the first and second sets of linework and contone colors are compared. If, in determination block 920, it is found that the colors are the same, then the first set of linework and contone colors is returned in block 999. Otherwise, if in determination block 920 it is found that the colors are different, then the linework and contone colors of the second set are returned in block 998. Those of ordinary skill in the art and others will appreciate that the other alternative embodiments are possible. For example, in yet another exemplary alternate embodiment of a similar routine, if in determination block 920 it is found that the colors are different, then the linework and contone colors of the first set are returned in block 998.

FIG. 10 illustrates a pattern determination subroutine 1000 for determining regular patterns of pixels in a graphical image. Subroutine 1000 begins at block 1001 and proceeds to block 1010 where color transitions are counted for the columns in the image. Transitions occur when two adjacent pixels are of a different color. Next, in block 1015, the color transitions for rows are also counted. Then, in block 1020, the boundaries of contone colors are determined from the transitions counted in blocks 1010 and 1015 by looking for regular transition counts in both the rows and columns. For example, the image 450 of FIG. 4B includes regular patterns of blocks of 9 pixels each. An observation of the regular transitions illustrated in image 450 will show that at every three rows and every three columns there is usually a transition. Accordingly, subroutine 1000 would determine that there is a pattern of 9 pixel blocks in image 450. Subroutine 1000 ends at block 1099 and returns the pattern that it has determined to the calling routine.

Figure 11:
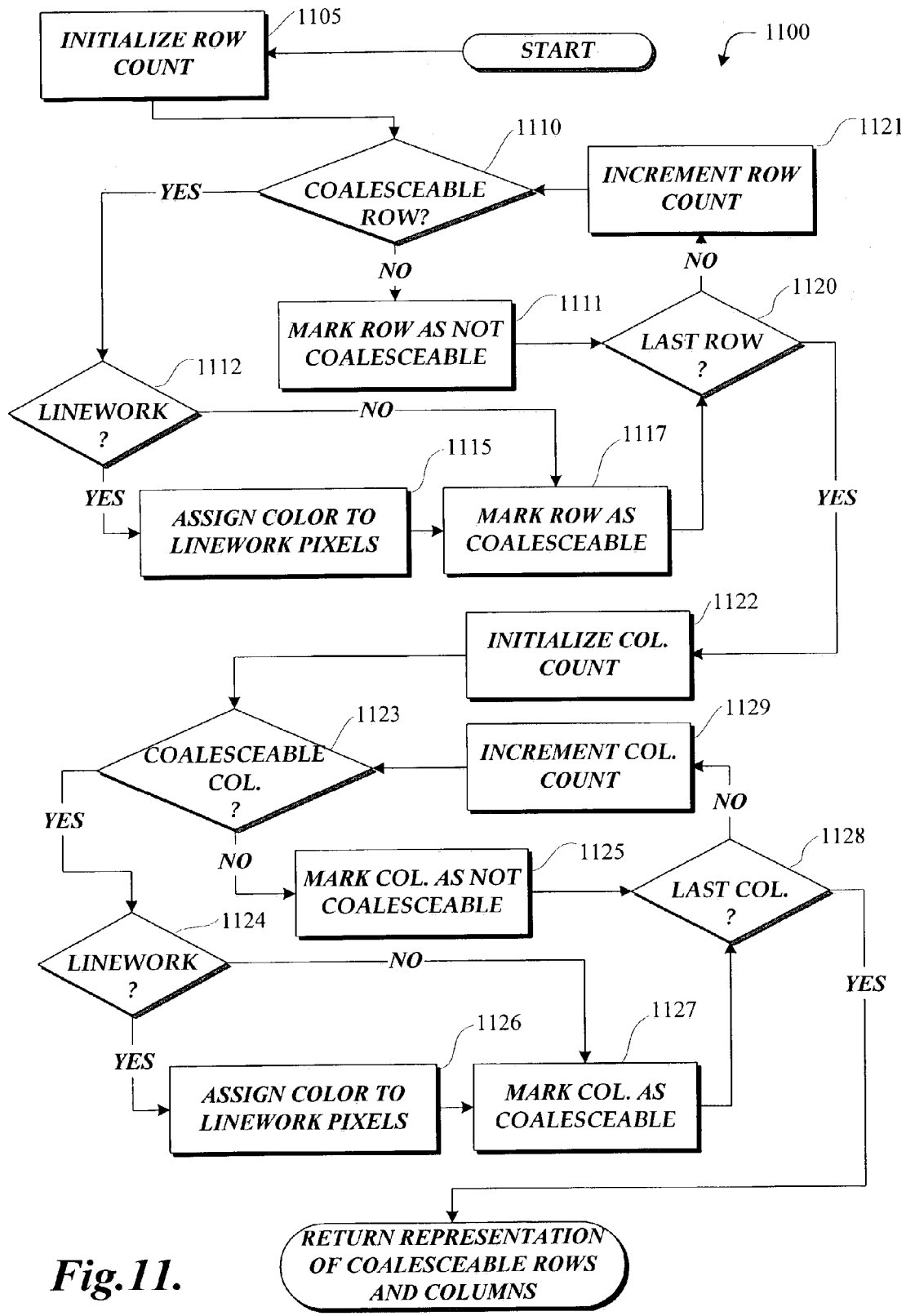
FIG. 11 is an overview flow diagram illustrating a subroutine for coalescing rows and columns as used by the routine in FIG. 6.

FIG. 11 illustrates an exemplary logic flow diagram of a method for determining which groups of pixel rows and pixel columns may be coalesced. Generally described, the method incrementally determines which rows may be coalesced with an adjacent row. Once all of the rows are processed, the method incrementally determines which columns may be coalesced with an adjacent column. Although this process shows one embodiment where the rows are processed before the columns, the method may include other embodiments where the columns are processed before the rows. Now referring to FIG. 11 in conjunction with the example shown on FIGS. 1, 2A, and 2B, one embodiment of the determination method 1100 will be described.

The determination method 1100 begins at block 1105 where a program variable storing a row count is initialized. As can be appreciated by those skilled in the art, a program variable storing the row count indicates the current row being processed. To illustrate one working example of the present invention, the row count can be set to the first row of an image file. With reference to the example of FIG. 1, the first row is referenced as row zero (0).

Next, at process block 1110, the method determines if the current row is coalesceable with one or more of the following rows. In this part of the process, a current row is determined to be coalesceable if one or more following rows contains an identical pixel arrangement. For instance, with reference to the example shown in FIG. 1, row zero (0) and row one (1) are determined to be coalesceable because the rows contain an identical pixel arrangement.

In one embodiment, the process of decision block 110 determines that a row is coalesceable if the pixel arrangement of the current row is identical to the adjacent row, or if the current row would be identical to the adjacent row when the linework pixels of one row are replaced with the color of a corresponding pixel in the adjacent row. Thus, in the example shown in FIG. 1, when row four (4) is being processed, it is determined that row 4 may be coalesced with rows five (5) and six (6) because the arrangement of the pixels of five (5) and six (6), without regard to the linework pixels, are identical to the pixels of row four (4). Thus, in this example, as shown in FIG. 2A, it is determined that row four (4) is coalesceable with rows five (5) and six (6). Once it is determine that the current row may be coalesced with one or more following rows, the method proceeds to decision block 1112, where a determination is made to see if one of the rows to be coalesced contains at least one linework pixel.

At decision block 1112, if it is determined that the rows to be coalesced do not contain at least one linework pixel, the determination method 1100 proceeds to block 1115 where the rows are marked as coalesceable rows. In this part of the process, individual variables or arrays of variables may be used to mark coalesceable rows. Next, the determination method 1100 proceeds to decision block 1120, where the method determines if the current row is the last row in the image file. In this part of the process, the last row may be any predetermined row, such as the last row of an image file, the last row of a tile, etc. At decision block 1120, if it is determined that the current row is not the last row in the image file, the method proceeds to process block 1121 where the method increments the row count. In this part of the process, the method increments the row count to a subsequent row that has not been processed by the determination method 1100. In the example of FIG. 1, the process of block 1121 would increment the row count to row two (2) after the processing of rows zero (0) and row one (1). After the processing of block 1121, the method returns to decision block 1110 where the above-described process is repeated until the last row of the image file is processed.

In the above-described method, at process block 1110, if the method determines that the current row is not coalesceable with one or more of the following rows, the determination method 1100 proceeds to block 1111 where the method marks the current row as a row that is not coalesceable. As can be appreciated by those skilled in the art, the process of block 1111 is optional, as the reverse upsampling method 600 described in FIG. 16, may operate by reading the variables generated in the process of block 1117.

In the above-described method, at process block 1112, if the method determines that one of the rows to be coalesced contains at least one linework pixel, the method proceeds to block 1115 where the method assigns colors to the linework pixels. In this part of the process, the linework pixels are assigned the color of a corresponding pixel of a row to be coalesced. For instance, with reference to FIG. 1, if the method is to coalesce rows four (4), five (5), and six (6), the method would assign the color of the pixels referenced as row four (4), columns 9-11, to the linework pixels of rows five (5) and six (6). The result of this process is shown in row four (4) of the modified image file of FIG. 2A.

Now returning to decision block 1120, if it is determined that the current row is the last row to be processed, the determination method 1100 continues to blocks 1122-1129, where the columns of the image file are processed. The process of blocks 1122-1129 is carried out in a manner described above with respect to process blocks 1105-1121. Generally described, the process of block 1122 initializes the column count to the first column of the image file. In the example shown in FIG. 1, the current column would be set to column zero (0). The process then cycles through process blocks 1123-1129, where individual columns are processed to determine which columns should be coalesced. Similar to the process described above, columns are determined to be coalesceable if two or more columns have identical pixel patterns if the pixel arrangement of the current column is identical to the adjacent column, or if the current column would be identical to the pixel arrangement of the adjacent column when the linework pixels of one of the columns are replaced with the color of a corresponding pixel in the adjacent column. In the process of decision block 1123, linework pixels are not considered in the analysis of the pixel patterns. In the processing of blocks 1123-1129, individual columns are marked as coalesceable or as not coalesceable, and the processing continues until all of the columns are analyzed. Once the method determines that the last column of the image file has been processed, the determination method 1100 terminates and returns the representation of coalesceable rows and columns to the calling routine, which in this example is the upsampling method 600 of FIG. 6.

While the preferred embodiment of the invention has been illustrated and described, it will be appreciated that various changes can be made therein without departing from the spirit and scope of the invention. In particular, it will be appreciated by those of ordinary skill in the art that other techniques may be used to identify contone and linework data in an image. However, subroutines 700, 800, and 900 present exemplary techniques which may be used on their own or in combination with others to determine contone and linework data in images.

The embodiments of the invention in which an exclusive property or privilege is claimed are defined as follows:

1. A method for reducing image data, wherein the image comprises a plurality of pixels, the method comprising: determining a first set of pixels of an image in memory to be coalesced with a second set of pixels of an image in memory, the first and second sets being adjacent to one another and being oriented in a first direction; determining a third set of pixels of an image in memory to be coalesced with a fourth set of pixels of an image in memory, the third and fourth sets being adjacent to one another and being oriented in a second direction; coalescing the first and second sets of pixels; and coalescing the third and fourth sets of pixels; and transmitting the image from memory.

2. The method of claim 1, wherein the first and second sets of pixels comprise rows of pixels, and the third and fourth sets of pixels comprise columns of pixels.

3. The method of claim 1, wherein each of the pixels comprises a color and the method further comprises categorizing the colors of the pixels in the image as contone colors and linework colors.

4. The method of claim 3, wherein pixels categorized as linework are collapsible with any adjacent pixel.

5. The method of claim 4, wherein categorizing colors comprises: calculating the number of pixels in the image that are the same color; determining if a first pixel color is significantly more common than other pixel colors in the image; and designating pixels of said first pixel color as linework in the image.

6. The method of claim 4, wherein categorizing colors comprises: determining a regular pattern of pixels from the image; locating pixels of a first color that do not conform to said regular pattern; and designating said pixels of said first pixel color as linework in the image.

7. The method of claim 6, wherein determining a regular pattern comprises: calculating color transitions along said first group; calculating color transitions along said third group; determining pattern boundaries of contone colored pixels based on high transition counts as indicating pattern boundaries; and determining a regular pattern in the image based on said pattern boundaries.

8. The method of claim 4, wherein categorizing colors comprises: calculating the number of pixels of each pixel color in the image; determining if at least one first pixel color is significantly more common than other pixel colors in the image; determining a regular pattern of pixels from the image; and locating pixels of at least one second color that do not conform to said regular pattern.

9. The method of claim 8, further comprising: determining that there is more of said at least one first pixel color than of said at least one second pixel color; and designating said at least one first pixel color as linework in the image.

10. The method of claim 8, further comprising: determining that there is less of said at least one first pixel color than of said at least one second pixel color; and designating said at least one second pixel color as linework in the image.

11. The method of claim 9, further comprising designating all pixel colors at both said at least one first pixel color and said at least one second pixel color as linework in the image.

12. The method of claim 8, further comprising designating either said at least one first pixel color or said at least one second pixel color as linework in the image based on predetermined preference.

13. The method of claim 8, wherein determining a regular pattern comprises: calculating color transitions in said first group; calculating color transitions in said third group; determining pattern boundaries of contone colored pixels based on high transition counts as indicating pattern boundaries; and determining a regular pattern in the image based on said pattern boundaries.

14. The method of claim 1, wherein said image is an upsampled image.

15. A method for reducing the storage required for an image, wherein the image comprises a first plurality of pixels of an image in memory with contone colors, and a second plurality of linework pixels of an image in memory with at least one linework color, the method comprising: determining which pixels in a first row of pixels in the image may be coalesced with a second row of pixels in the image, wherein any continuous tone pixels along said first row may be coalesced with an adjacent continuous tone pixel of the same color in said second row and an adjacent linework pixel of any color in said second row; determining which pixels along a first column of pixels in the image may be coalesced with a second column of pixels in the image, wherein any continuous tone pixels along said first column may be coalesced with an adjacent continuous tone pixel of the same color in said second column and an adjacent linework pixel of any color in said second column; coalescing the pixels along said first row with the pixels along said second row; and coalescing the pixels along said first column with the pixels along said second column; and transmitting the image from memory.

16. A computing apparatus having a processor and a memory having computer executable instructions for performing the method of claim 15.

17. A computer readable medium having computer executable instructions for performing the method of claim 15.

18. A method for reducing the storage required for an image, wherein the image comprises a plurality of pixels of an image in memory and each pixel comprises a color, the method comprising: determining pixels of the image in a first row to be coalesced with pixels along an adjacent row; determining pixels in a first column to be coalesced with pixels along an adjacent column; coalescing the pixels in said first row with the pixels in said adjacent row; and coalescing the pixels in said first column with the pixels along said adjacent column; and transmitting the image from memory.

19. A computing apparatus having a processor and a memory having computer executable instructions for performing the method of claim 18.

20. A computer readable medium having computer executable instructions for performing the method of claim 18.

21. A computing apparatus having a processor and a memory having computer executable instructions for performing the method for reducing image data, the method comprising: inputting into memory an image comprising a plurality of pixels; determining a first set of pixels of the image to be coalesced with a second set of pixels of the image, the first and second sets being adjacent to one another and being oriented in a first direction; determining a third set of pixels of the image to be coalesced with a fourth set of pixels of the image, the third and fourth sets being adjacent to one another and being oriented in a second direction;

coalescing the first and second sets of pixels; and coalescing the third and fourth sets of pixels.

22. A computer readable medium having computer executable instructions for performing the method for reducing image data, the method comprising: inputting into memory an image comprising a plurality of pixels; determining a first set of pixels of the image to be coalesced with a second set of pixels of the image the first and second sets being adjacent to one another and being oriented in a first direction; determining a third set of pixels of the image be coalesced with a fourth set of pixels of the image, the third and fourth sets being adjacent to one another and being oriented in a second direction; coalescing the first and second sets of pixels; and coalescing the third and fourth sets of pixels.

* * * * *